US008430996B2

(12) United States Patent
Kaspar

(10) Patent No.: US 8,430,996 B2
(45) Date of Patent: Apr. 30, 2013

(54) ELECTROCOAGULATION REACTOR HAVING SEGMENTED INTERMEDIATE UNCHARGED PLATES

(75) Inventor: Douglas Kaspar, Shiner, TX (US)

(73) Assignee: Kaspar Electroplating Corporation, Shiner, TX (US)

(*) Notice: Subject to any disclaimer, the term of this patent is extended or adjusted under 35 U.S.C. 154(b) by 526 days.

(21) Appl. No.: 12/787,715

(22) Filed: May 26, 2010

(65) Prior Publication Data
US 2011/0290667 A1 Dec. 1, 2011

(51) Int. Cl.
C25C 7/00 (2006.01)
C25F 7/00 (2006.01)
C02F 1/461 (2006.01)

(52) U.S. Cl.
USPC ........ 204/268; 204/278.5; 204/242; 205/742; 210/748.01

(58) Field of Classification Search .......... 205/742–761; 210/748.01, 748.17, 748.18
See application file for complete search history.

(56) References Cited

U.S. PATENT DOCUMENTS

| | | | |
|---|---|---|---|
| 672,231 A | 4/1901 | Lacomme | |
| 820,113 A | 5/1906 | Hinkson | |
| 2,864,750 A | 12/1958 | Hughes, Jr. et al. | |
| 3,247,901 A | 4/1966 | Stuetzer | |
| 3,314,872 A | 4/1967 | Waterman et al. | |
| 3,410,784 A * | 11/1968 | Lloyd et al. | 204/268 |
| 3,679,556 A | 7/1972 | Doevenspeck | |
| 3,766,037 A | 10/1973 | Lee | |
| 3,849,281 A | 11/1974 | Bennett et al. | |
| 3,925,176 A | 12/1975 | Okert | |
| 3,964,991 A | 6/1976 | Sullins | |
| 3,975,795 A | 8/1976 | Kupcikevicius et al. | |
| 4,032,426 A * | 6/1977 | de Nora et al. | 204/268 |
| 4,073,712 A | 2/1978 | Means et al. | |
| 4,085,028 A | 4/1978 | McCallum | |
| 4,124,480 A | 11/1978 | Stevenson | |
| 4,175,026 A | 11/1979 | Houseman | |
| 4,272,369 A | 6/1981 | Love | |
| 4,293,400 A | 10/1981 | Liggett | |
| 4,339,324 A | 7/1982 | Haas | |
| 4,347,110 A | 8/1982 | Jyoce | |
| 4,378,276 A | 3/1983 | Liggett et al. | |
| 4,406,768 A | 9/1983 | King | |
| 4,500,403 A | 2/1985 | King | |
| 4,789,450 A | 12/1988 | Paterson | |

(Continued)

FOREIGN PATENT DOCUMENTS

| | | |
|---|---|---|
| EP | 0794157 A1 | 9/1997 |
| FR | 2707282 | 1/1995 |
| WO | WO 91/13029 | 9/1991 |
| WO | WO 96/40591 | 12/1996 |

*Primary Examiner* — Nicholas A Smith
*Assistant Examiner* — Brian W Cohen
(74) *Attorney, Agent, or Firm* — Jackson Walker, LLP

(57) ABSTRACT

An electrocoagulation reactor for the treatment of wastewater. The electrocoagulation reactor typically engages a DC power source and a source of wastewater to be treated. It has a housing with walls and a wastewater inlet, and a treated wastewater outlet. There is at least one anode/cathode pair of oppositely charged spaced apart plates that engage the power source to charge the anode with a positive charge and the cathode with a negative charge. Between each anode/cathode pair is at least one segmented intermediate plate, which is not engaged to the power source of electrical energy, and which intermediate plate is segmented into multiple segments, which multiple segments lay generally in the same plane.

9 Claims, 6 Drawing Sheets

U.S. PATENT DOCUMENTS

| | | |
|---|---|---|
| 4,790,923 A | 12/1988 | Stillman |
| 4,872,959 A | 10/1989 | Herbst et al. |
| 4,902,391 A | 2/1990 | Ibbott |
| 5,043,050 A | 8/1991 | Herbst |
| 5,234,555 A | 8/1993 | Ibbott |
| 5,271,814 A | 12/1993 | Metzier |
| 5,302,273 A | 4/1994 | Kemmerer |
| 5,423,962 A | 6/1995 | Herbst |
| 5,458,758 A | 10/1995 | Suchacz |
| 5,531,865 A | 7/1996 | Cole |
| 5,549,812 A | 8/1996 | Witt |
| 5,611,907 A | 3/1997 | Herbst |
| 6,139,710 A | 10/2000 | Powell |
| 6,179,977 B1 | 1/2001 | Herbst |
| 2004/0079650 A1* | 4/2004 | Morkovsky et al. .......... 205/742 |
| 2007/0068826 A1* | 3/2007 | Morkovsky et al. .......... 205/742 |

* cited by examiner

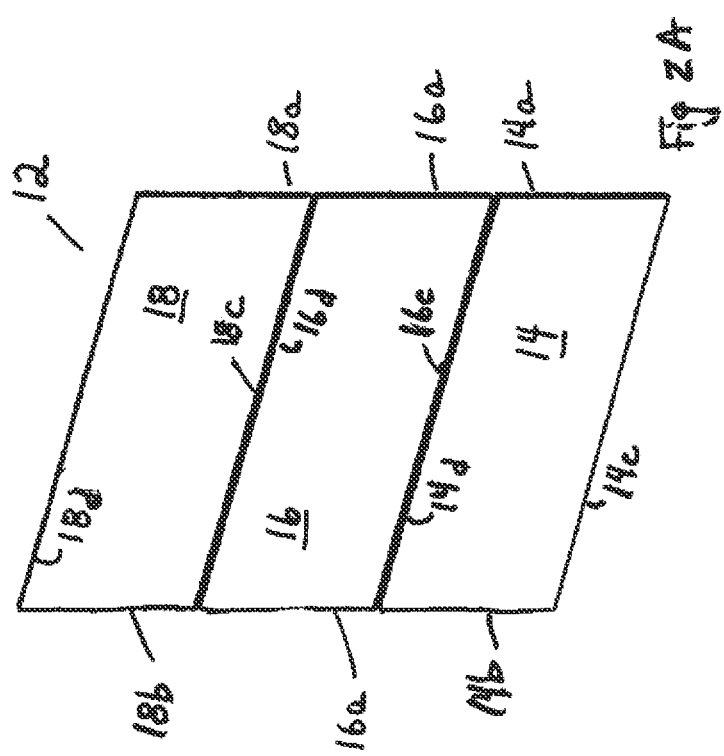

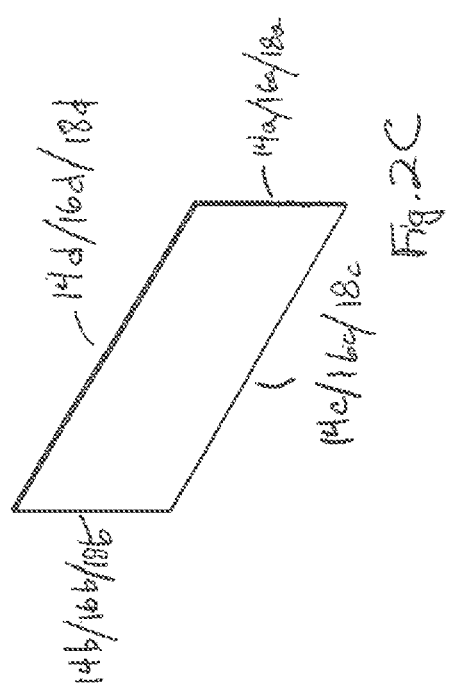

ELECTROCOAGULATION REACTOR HAVING SEGMENTED INTERMEDIATE UNCHARGED PLATES

This application incorporates by reference, the following issued U.S. Pat. Nos. 5,928,493; 6,294,061; and 6,689,271.

This application also incorporates by reference, the following pending application Ser. No. 11/581,695.

FIELD OF THE INVENTION

Wastewater treatment devices, more particularly, an electrocoagulation reactor having segmented intermediate plates between the oppositely charged plates.

BACKGROUND OF THE INVENTION

Electrocoagulation devices for treatment of wastewater may include parallel charged oppositely charged plates with solid intermediate uncharged plates therebetween.

OBJECTS OF INVENTION

An improved electrocoagulation reactor.

BRIEF DESCRIPTION OF THE DRAWINGS

FIGS. 2A, 2B, and 2C are illustrations of Applicant's segmented intermediate uncharged plates; FIG. 2A being an isometric view of a segmented intermediate plate having three segments; FIG. 2B being a front elevational view of a segmented intermediate plate having three segments; FIG. 2C being an isometric view of a single segment separate and apart from the plate itself.

DETAILED DESCRIPTION OF THE PREFERRED EMBODIMENT

Applicant discloses an electrocoagulation reactor for treatment of wastewater, the electrocoagulation water for engagement with a DC power supply and a source of wastewater. The electrocoagulation reactor typically includes a housing having walls and one or more inlets for receiving wastewater therein. At least one anode/cathode pair of oppositely charged spaced apart plates are engaged with a power source to charge the anode with a positive charge and the cathode with a negative charge. Each pair has between it at least one segmented intermediate plate, which is not engaged with a power source and which segmented intermediate plate consists of multiple separate segments, which multiple segments lay together generally in the same plane.

Figure 1A:
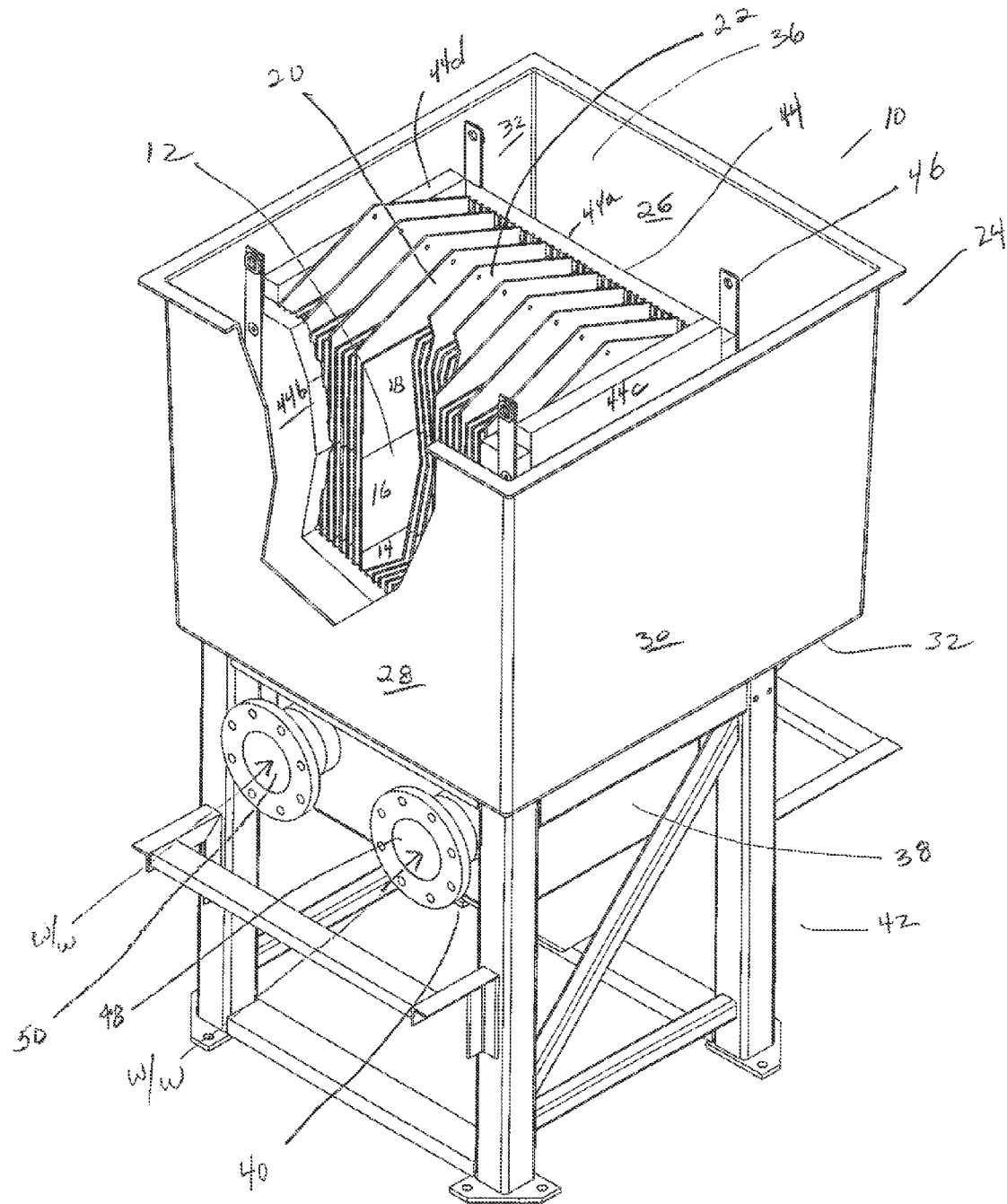
FIGS. 1A and 1B are an isometric and a side elevational cutaway view, respectively, of the electrocoagulation reactor on a support stand.
Figure 1B:
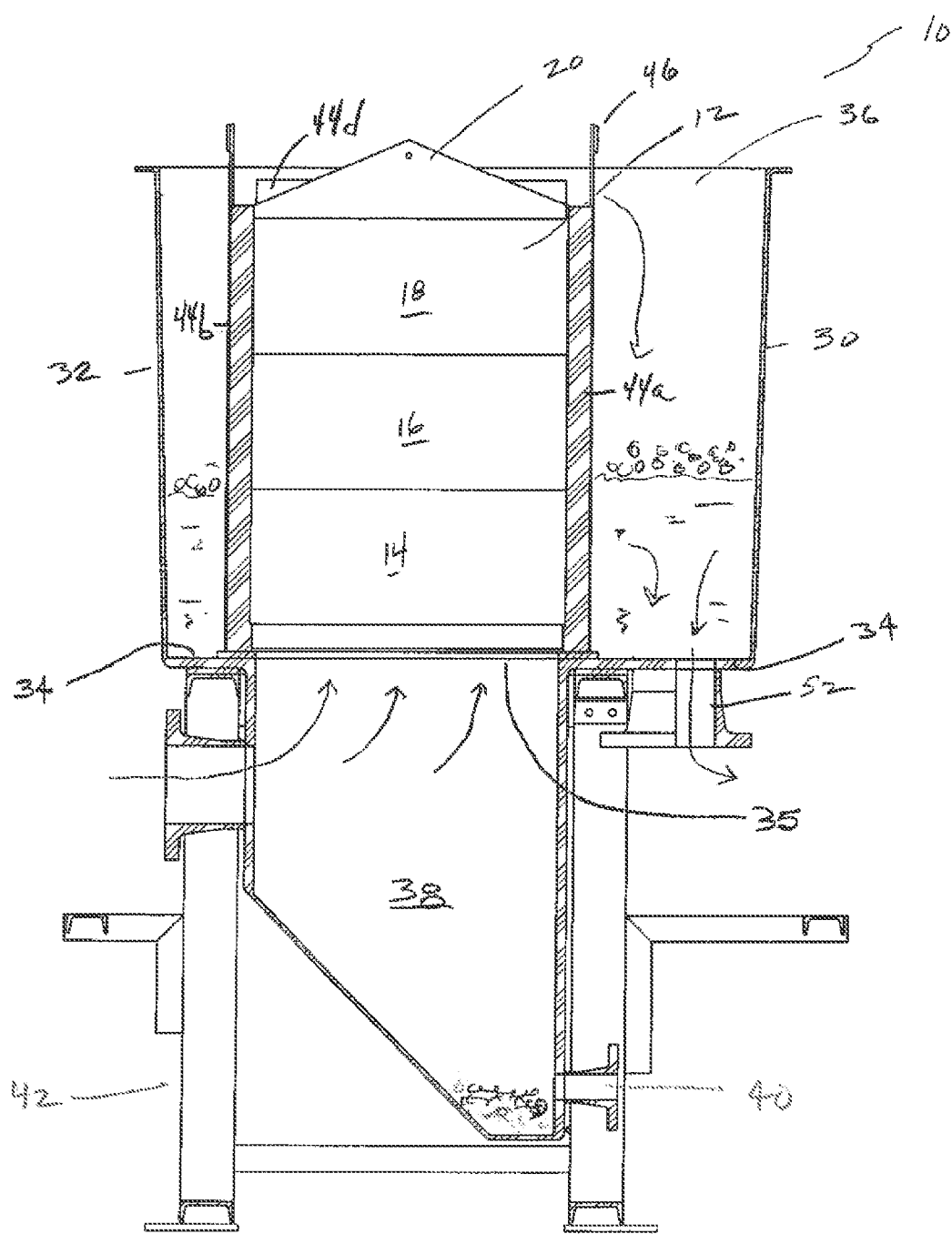

Turning now to the drawings, it is seen that in FIGS. 1A and 1B, an electrocoagulation reactor 10 is presented. At least one segmented intermediate plate 12 is provided between a pair of opposite charged plates, a cathode 20 and an anode 22.

The electrocoagulation reactor 10 typically has a multiplicity of oppositely charged plates or anode/cathode pairs 20/22 and typically has a multiplicity of segmented intermediate plates 12 therebetween. For example, in FIG. 1A, the electrocoagulation reactor 10 is seen to have nine pairs of charged plates 20/22 and each pair has three segmented intermediate plates therebetween with each of these comprising three segments.

Housing 24 may be provided, made of fiberglass or other typically non-conductive or inert materials (with respect to the wastewater). The housing may be square or rectangular and may include end walls 26/28, side walls 30/32, and, typically, a partial bottom wall 34 defining a bottom opening 35 therein. A generally open top 36 is provided and a sump 38 below bottom opening 35 is typically provided. At the bottom of the sump is a sump drain port 40. The entire electrocoagulator reactor or the housing 24 may sit on a support stand 42.

Turning back to the plates, it is seen that the electrocoagulation reactor is designed to receive all of the plates, the segmented intermediate plates as well as the charged plates, in a manner that keeps them spaced apart from one another, but parallel to one another. Moreover, it is seen that a cartridge 44 may be provided for this purpose, which cartridge typically includes side walls 44a/44b and end walls 44c/44d. Both the bottom of cartridge 44 and the top are substantially open and it is seen that the perimeter at the bottom defined by the lower edges of the four walls 44a/44b/44c/44d sits along the perimeter defining bottom opening 35 in such a manner that wastewater entering wastewater inlets 48/50 will move up in parallel fashion between the plates and flow out the top edges of side walls 44a/44b, which are slightly lower than end walls 44c/44d.

Moreover, with reference to FIGS. 1A and 1B, it is seen that the segmented intermediate plates are uncharged and the upper edges thereof are typically at or below the top edges of side walls 44a/44b, while the bottom edge of the segment intermediate plates may be typically at or slightly above the bottom edge of the side walls.

The cartridge side walls have grooves or similar structure therein, which grooves are adapted to snugly hold the segments of the intermediate plates to maintain them vertically with respect to one another in the cartridge.

In an alternate preferred embodiment, the segmented intermediate plates can be adapted to be received in slots directly in the housing of or somehow otherwise engaged in the housing of the electrocoagulation reactor itself. That is to say, the segmented intermediate plates in the preferred embodiment are held in the cartridge, but as in other prior art electrocoagulation reactors, the side walls of the housing which hold the fluid therein can also be adapted by slots or other means known in the art to receive segments of a segmented intermediate plate as such prior art would receive a typical solid (unsegmented) uncharged intermediate plate.

That is to say, Applicant's novelty lies, in part, in providing a multiplicity of portions to a segmented plate rather than having an intermediate plate being fully integral.

It is believed that having a segmented intermediate uncharged plate between oppositely charged plates in an electrocoagulation reactor may more efficiently or effectively provide for the elimination of the harmful and deleterious components of the wastewater.

Figure 2B:
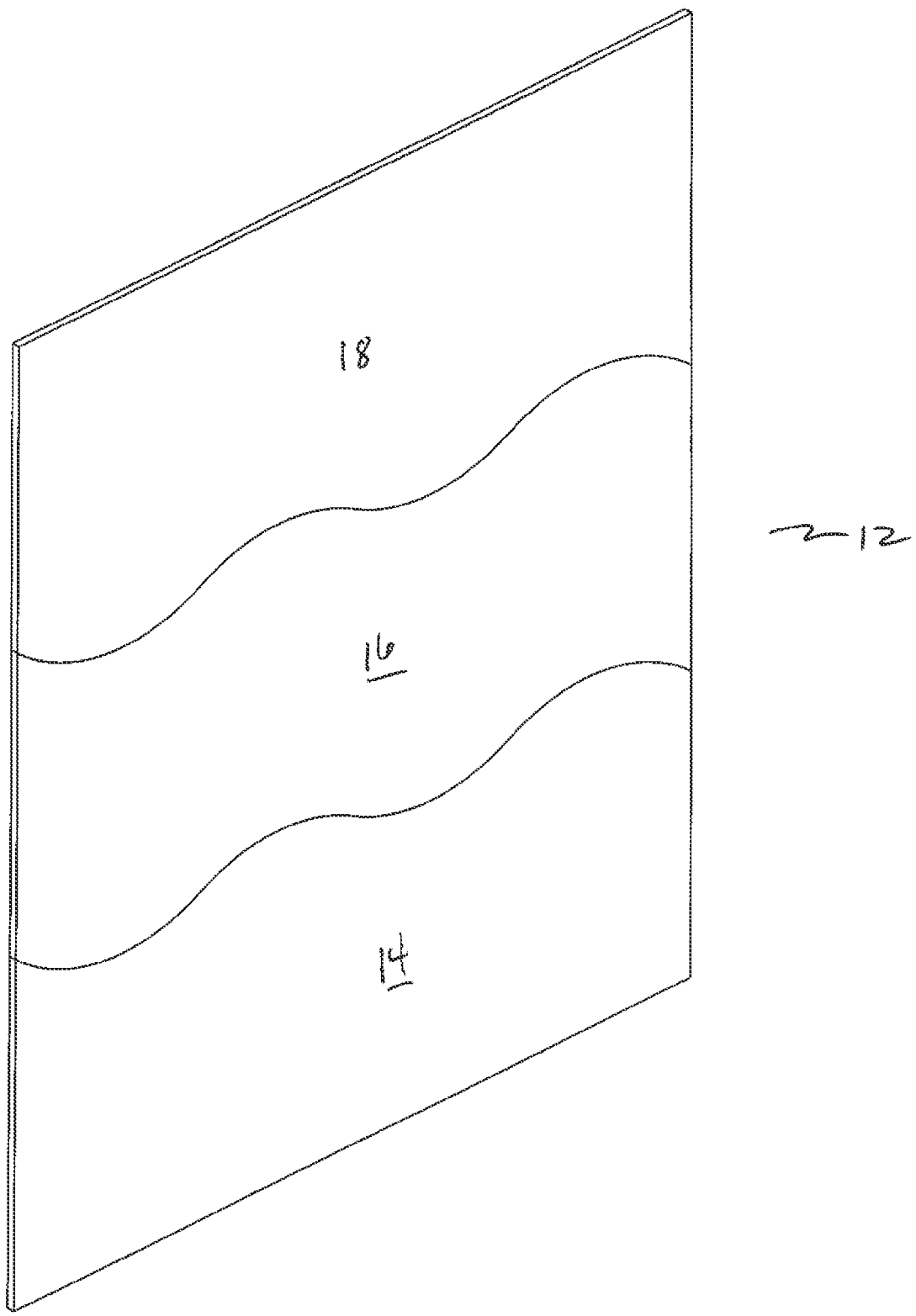

It may be seen that a segmented intermediate plate 12 may be comprised of two or more segments, here in FIG. 2A, illustrating three segments 14/16/18. In one preferred embodiment, each of the two or more segments are rectangular; here, segment 14 having side edges 14a/14b, bottom edge 14c, and top edge 14d. Segment 16 likewise has edges 16a/16b/16c/16d in the same orientation. Last, segment 18 is seen to have edges oriented in the same manner edges, 18a/18b/18c/18d. Side edges are intended to engage housing and/or cartridge as a full (unsegmented) intermediate plate or as a charged plate would. Yet, when the segments are inserted, they may engage adjacent segments in the manner illustrated, having a bottom edge of the segment above engaging or resting at least partially on the top edge of the segment below. That is to say, for example, in FIG. 4A, it is seen that top edge 14d provides vertical support by engaging at least partially bottom edge 16c of the segment just above it. Likewise, top edge 16d may provide vertical support to bottom edge 18c of segment 18.

Moreover, it is seen that the segments generally lay in the same plane and are generally, typically, tabular. Indeed, in a preferred embodiment, each segment may be rectangular. However, though the segments may be generally tabular, they need not have straight top and bottom edges, for example, see FIG. 2B. Even when the top and bottom edges of adjacent segments are not straight, they are typically complementary so they can substantially rest in the manner illustrated and described.

The segmented intermediate plates may be made of mild steel or aluminum or a combination of conductive materials. While three segments are illustrated, a preferred range of 2 to 5 is indicated, for the number of segments per plate. While it is also illustrated that there are three segmented intermediate plates between adjacent anode/cathode pair, one segmented plate or up to five segmented plates between an anode/cathode pair are provided as a preferred range.

Further, one may combine, between anode/cathode pair, some intermediate plates that are segmented and some intermediate plates that are non-segmented with some of the plates having a different conductive material than others.

Figure 3:
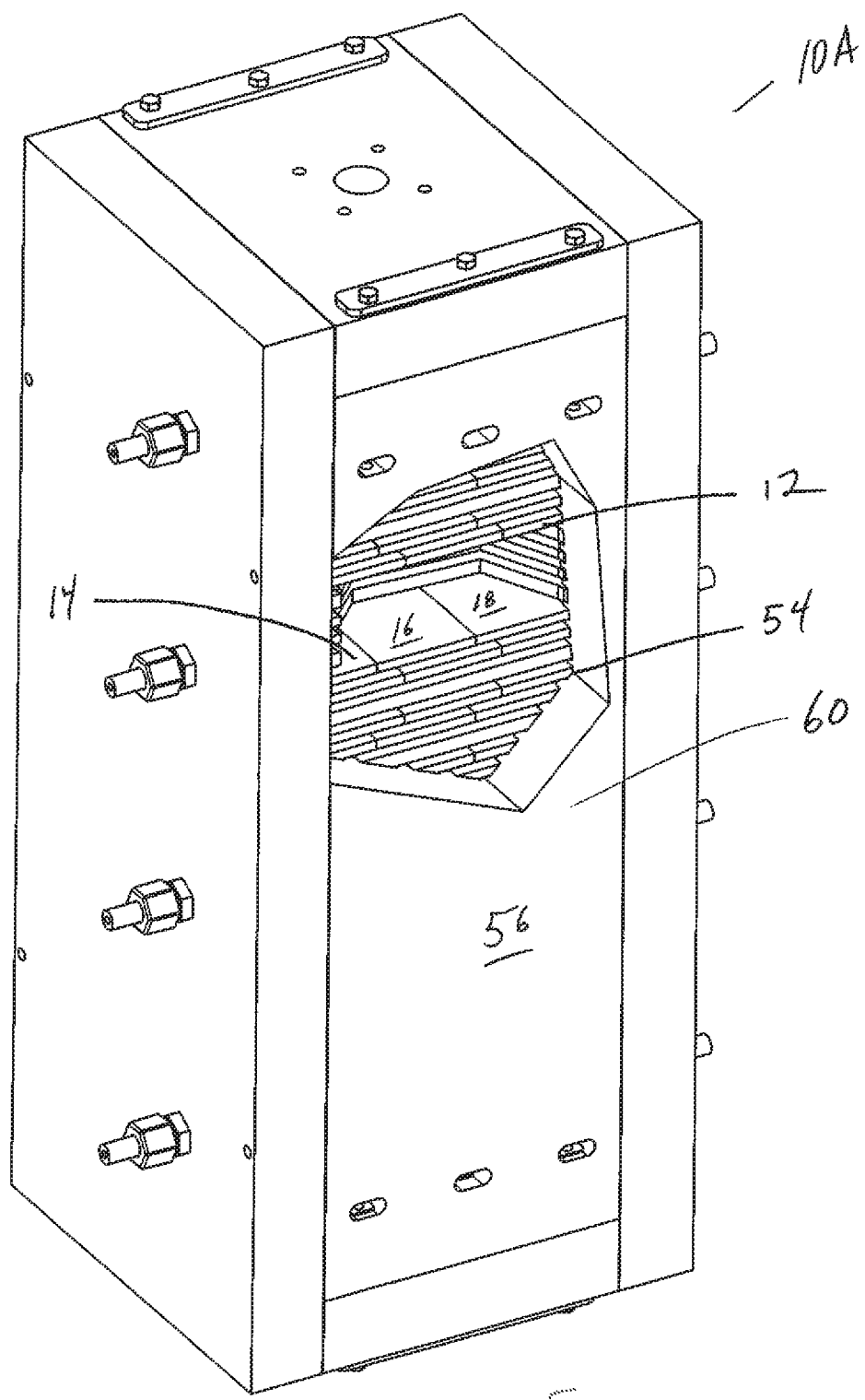
FIG. 3 is an isometric view from the right side of an electrocoagulation reactor in an alternate preferred embodiment wherein the segmented plates are horizontal and are maintained in position by notches in the side wall.

Further, it is seen that, while in the preferred embodiment the segmented plates maintain vertically by vertical grooves, in an alternate preferred embodiment illustrated in FIG. 3, the segmented plates may be maintained at other configurations. In these other configurations, it may be preferred to have the edges that maintain the segments to apply some compression, so as to hold snugly the segments of a segmented plate so that their borders or edges are in contact.

As seen in FIG. 3, alternate embodiment 10A has multiplicity of segmented plates 12, wherein the plates are substantially horizontal and the segments engaged are horizontally trending notches 54 here in the side walls 56 of housing 60, wherein the previous embodiment the notches are grooves in the side walls of the cartridge are vertical. So as to maintain the plates vertically, the notches, slots or guides in the side walls 56 turning horizontally and engage the side edges of the multiple plates to hold them in general parallel alignment.

The embodiment illustrated in FIGS. 1A and 1B is seen to be a parallel flow reactor. In the parallel flow reactor, a water molecule will typically make one path between the anode and the cathode to a charged field and, as seen here, will then flow out the top of the reactor portion of the housing (the cartridge). That is, the water enters below and each specific volume of water passes up between a single pair of plates before it undergoes treatment.

Turning to FIG. 3, a series flow reactor is illustrated. Here, water will enter typically at the bottom, in need of wastewater treatment, and treated wastewater will come out the top. However, the molecules will follow a serpentine flow and typically pass through each pair of spaced apart plates, rather than as in a parallel flow, just a single pair.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. An electrocoagulation reactor for the treatment of waste water, the electrocoagulation reactor for engagement with a DC power source and a source of waste water, the electrocoagulation reactor comprising:
    a housing having walls and having an inlet for receiving waste water therein;
    a multiplicity of anode/cathode pairs of oppositely charged spaced apart plates engaged with a power source to charge the anode with a positive charge and the cathode with a negative charge wherein each pair has between it at least one segmented intermediate plate which is not engaged with the power source of electrical energy which segmented intermediate plate consists of multiple segments, which multiple segments lay generally in the same plane and;
    wherein each of the segments of the segmented intermediate plate has a top edge, two side edges, and a bottom edge and wherein at least one bottom edge of a segment is in contact with a top edge on another segment of the segmented intermediate plate.

2. The electrocoagulation reactor of claim 1, wherein the segments of the segmented intermediate plate are rectangular.

3. The electrocoagulation reactor of claim 1, wherein the housing is dimensioned to receive each of the multiple rectangular segments, to engage each segment at the side edges thereof to locate each segment with respect to the housing.

4. The electrocoagulation reactor of claim 1, wherein each segmented intermediate plate engages the housing so it is perpendicular to a bottom wall thereof.

5. The electrocoagulation reactor of claim 1, wherein the housing is generally rectangular, having two end walls, two side walls, a bottom wall, and a substantially open top and wherein each segmented intermediate plate engages the housing so that it is perpendicular to the bottom wall.

6. The electrocoagulation reactor of claim 5, each wherein the segments of the segmented intermediate plate are generally rectangular each having a top edge, two side edges, and a bottom edge.

7. The electrocoagulation reactor of claim 6, wherein the housing rests on a support surface and is dimensioned to receive each of the multiple rectangular segments, to engage each segment at the side edges thereof to at least partially locate each segment with request to the housing.

8. An electrocoagulation reactor for the treatment of waste water, the electrocoagulation reactor for engagement with a DC power source and a source of waste water, the electrocoagulation reactor comprising:
    a housing having walls and having an inlet for receiving waste water;
    a multiplicity of anode/cathode pairs of oppositely charged spaced apart plates engaged with a power source to charge the anode with a positive charge and the cathode with a negative charge wherein each pair has between it at least one segmented intermediate plate which is not engaged with the power source, which segmented intermediate plate consists of multiple segments, which multiple segments lay generally in the same plane;
    wherein the segments of the segmented intermediate plate are rectangular each having a top edge, two side edges, and a bottom edge;
    wherein the housing rests on a support surface and is dimensioned to receive each of the multiple rectangular segments, to engage each segment at the side edges thereof to at least partially locate each segment with request to the housing;

wherein each segmented intermediate plate engages the housing so it is perpendicular to a bottom wall thereof;

wherein at least one bottom edge of a segment is in contact with a top edge an adjacent segment of the segmented intermediate plate.

9. An electrocoagulation reactor for the treatment of waste water, the electrocoagulation reactor for engagement with a DC power source and a source of waste water, the electrocoagulation reactor comprising:

a housing having walls and having an inlet for receiving waste water;

wherein the housing is rectangular, having two end walls, two side walls, a bottom wall, and a substantially open top;

a multiplicity of anode/cathode pairs of oppositely charged spaced apart plates engaged with a power source to charge the anode with a negative charge and the cathode with a positive charge wherein each pair has between it at least one segmented intermediate plate which is not engaged with the power source, which segmented intermediate plate consists of multiple segments, which multiple segments lay generally in the same plane;

wherein the segments of the segmented intermediate plate are rectangular;

wherein each of the segments of the segmented intermediate plate has a top edge, two side edges, and a bottom edge and wherein at least one bottom edge a segment is in contact with a top edge on an adjacent segment of the segmented intermediate plate;

wherein the housing rests on a support surface and is dimensioned to receive each of the multiple rectangular segments of the segmented intermediate plate, to engage each segment at the side edges thereof to at least partially locate each segment with respect to the housing;

wherein each segmented intermediate plate engages the housing so it is perpendicular to a bottom wall thereof;

wherein the at least one segmented intermediate plate consists of multiple segmented intermediate plates; and wherein the multiple segmented intermediate plates are parallel to one another and parallel to the anode/cathode plates.

* * * * *